Aug. 19, 1958  J. E. OWEN  2,848,710
REMOTE READING FLUID PRESSURE GAUGE
Filed March 26, 1954  3 Sheets-Sheet 1

INVENTOR.
JOHN E. OWEN
BY
Kenyon & Kenyon
ATTORNEYS

Aug. 19, 1958  J. E. OWEN  2,848,710
REMOTE READING FLUID PRESSURE GAUGE
Filed March 26, 1954  3 Sheets-Sheet 3

INVENTOR.
JOHN E. OWEN
BY Kenyon & Kenyon
ATTORNEYS

United States Patent Office 2,848,710
Patented Aug. 19, 1958

2,848,710
REMOTE READING FLUID PRESSURE GAUGE

John E. Owen, Tulsa, Okla., assignor to Geophysical Research Corporation, New York, N. Y., a corporation of New Jersey Application March 26, 1954, Serial No. 419,044

4 Claims. (Cl. 340—200)

This invention relates to a remote reading fluid pressure gauge which is particularly adapted for use in measuring pressures in oil wells under various flowing or pumping conditions. When applied to this use the gauge provides for an element which may be lowered into the well and left there while obtaining all of the desired measurements since these are obtained by equipment located on the ground. Although the invention is particularly applicable to oil well use its principles may find application wherever it is desired to measure fluid pressures at a distance from the point of measurement.

One of the objects of the present invention is to provide an improved ultramicrometer capacitance gauge which is adapted to be read at a remote location from the capacitance element. Another object is to provide an ultramicrometer capacitance gauge in a form permitting its accurate use under widely varying temperature conditions. This is of particular importance in connection with oil well use where high temperatures are apt to be encountered. Still another object is to provide this improved form of ultramicrometer capacitance gauge with an arrangement permitting it to be read remotely, this being another important characteristic in connection with oil well use. It is to be noted that these same advantageous features would be useful in connection with various other fluid pressure measuring applications.

Specific examples of oil well pressure gauges, incorporating the principles of the invention, are disclosed hereinbelow with the aid of the accompanying drawings in which:

Fig. 1 schematically shows one form of the gauge in use;

Figure 1:
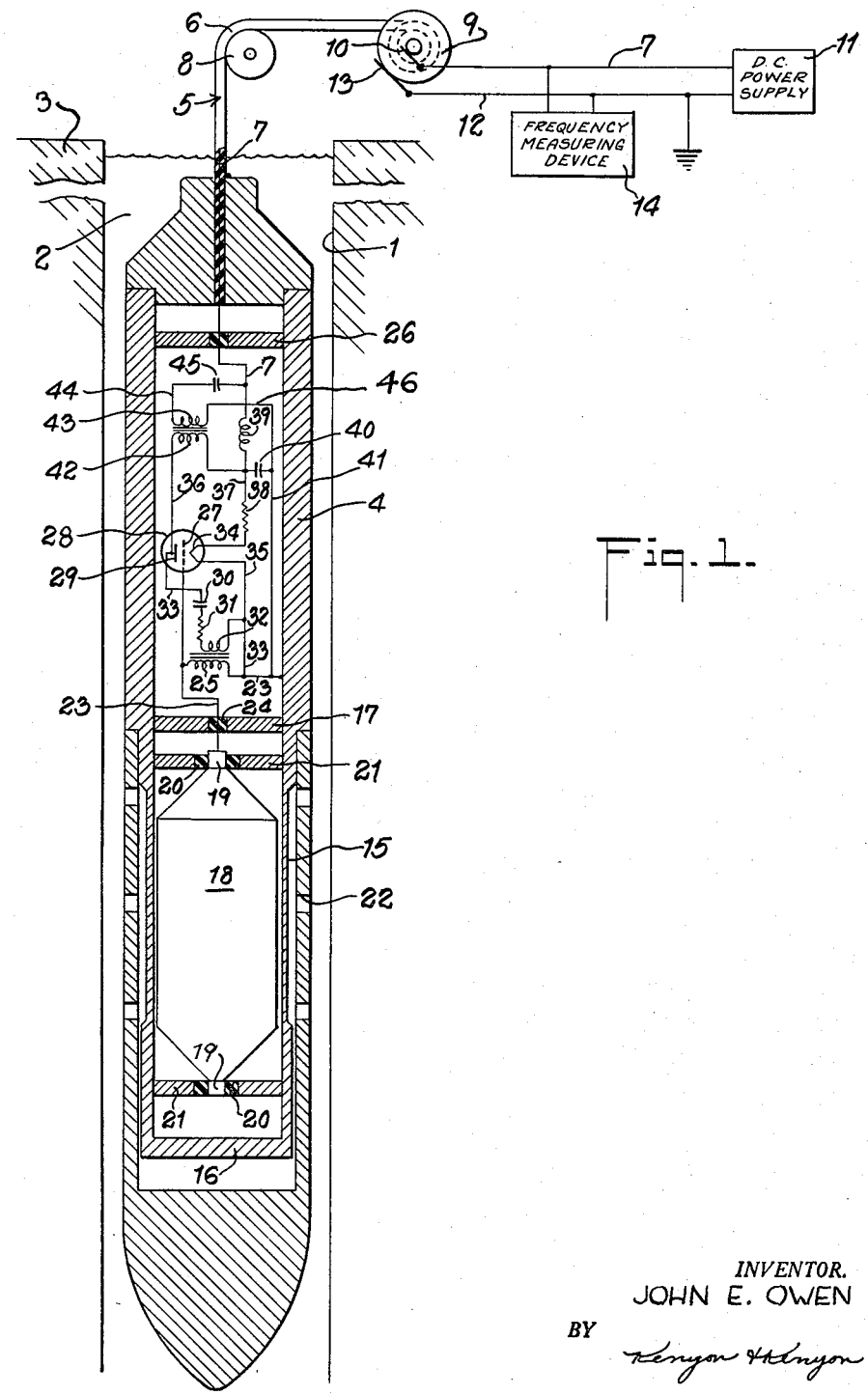

Referring first to the form shown by Fig. 1, the well 1 is shown filled with the usual fluid 2 while the ground surface is shown at 3. The well 1 is intended to represent an oil well which may be quite deep and it is assumed that it is desired to measure the bottom hole pressure of this well under varying conditions, thus requiring a plurality of measurements.

The instrument itself, which is lowered into the well, has a long and cylindrical outer casing 4. In the drawing the diameter of this casing is greatly exaggerated, respecting the casing's length, because this permits a schematic showing of the elements housed within the casing. This casing is suspended by a cable 5 having an outer metallic armor 6 and containing a single conductor 7 which is insulated from the armor 6. This cable is connected to the top of the casing 4 and the cable armor is in electrical contact with the casing 4, the latter being made of metal. The cable 5 is guided down into the well, by a sheave 8, from a supply drum 9 which is powered so that the instrument may be lowered and raised respecting the well.

The conductor 7 carries D. C. current into the casing 4, this conductor 7 connecting through a brush and slip ring assembly 10 with a source of D. C. power 11. This supply 11 is grounded to the cable armor 6 through a line 12 and a slip ring and brush assembly 13.

An alternating current frequency meter 14 is connected between the lines 7 and 12 above the ground. This may be any device suitable for measuring the frequency of the current, one which has been used being of the type which permits a determination of the number of cycles occurring in ten seconds, the frequency being calculated in an obviously simple manner. A direct reading frequency meter could also be used. However, in all instances care should be taken to make certain that the meter operates accurately.

Returning to the casing 4, which is lowered deep in the well 1, the lower part of this casing mounts the capacitor of an ultramicrometer capacitance gauge. This is formed by a cylinder 15 having a closed bottom 16 and an upper end which is hermetically sealed by a wall 17, the cylinder 15 having a wall thickness permitting at least slight radial strain in an elastic manner when subjected to the fluid pressure in the well. This cylindrical wall 15 forms one electrostatic plate, the other plate being formed by a cylinder 18 located concentrically within the cylinder 15 so that there is a slight space between the two. This space is very small, an example of a suitable spacing being 0.003". The cylinder 18 is positioned by having concentric end projections 19 which are mounted in insulating bushings 20 which are, in turn, positioned by transverse strut members 21.

The constructional features being described may be widely varied. The illustrated form is intended to schematically support a description of the invention.

The capacitor or condenser, formed by the parts 15 and 18, varies in capacity in proportion to the deflection of the cylindrical wall 15. This wall 15 may be of less diameter than is the casing 4 and this casing may extend over the cylinder 15 so as to protect it against abrasion or other damage, holes 22 through the casing permitting the well fluid to have free access to the outside of the cylinder 15. The space between the two plates 15 and 18 may be occupied by non-conducting fluid or gas or may be evacuated, the wall 17 forming an hermetic barrier.

The plate 15 is grounded respecting the metal casing 4 and the cylinder 18 is connected to the casing, by a line 23 which extends through an insulating bushing 24 in the wall 17, in series with an inductor 25 which, with the balance of the components described hereinafter, is located in the casing 4 above the wall 17. The space just defined is fluid-tight so that the electronic equipment is protected from the well fluid. The upper end of the space is sealed by a wall 26 or by the upper end of the casing.

The described capacitor and inductor forms the resonant circuit required by the gauge, the resonant frequency being capable of calculation in the usual manner. This circuit is tuned by the capacitor which varies in capacitance in accordance with the fluid pressure applied to the cylinder 15 by the well fluid. The inductor 25 may be a Permalloy dust core choke having primary and secondary windings, the primary winding being the inductor 25.

The common point between the inductor 25 and plate 18 of the variable condenser is connected to the grid 27 of an electron tube 28, which is illustrated as a triode whose plate 29 is connected, through a fixed capacitor 30 and resistor 31, through the secondary winding 32, of the previously described inductor or choke, to ground or, in other words, to the casing 4. This connection through the capacitor 30, resistor 31 and the choke's secondary 32 is effected by a line 33. The cathode 34 of the tube 28 connects through a line 35 with ground and thus is formed, with the inductor 25 and the gauge capacitor, an electronic oscillator whose frequency, of course, is varied or tuned by the gauge capacitor whose capacitance is varied by the fluid pressure.

The plate circuit of tube 28 is connected to 7 through 42—43, 36, 44, 45. It is to be noted that the cathode 34 is formed by the filament of the tube 28, although a tube with an indirectly heated cathode could also be used. It is now apparent that the D. C. power supply 11 powers both the filament and plate circuits of the tube 28. This means that the voltage must be high enough for the plate circuit, and to drop this voltage to a value suitable to the filament circuit a resistor 38 is connected in the filament circuit formed by the line 37. This makes it possible for the power source 11 to power both circuits properly.

Line 37 is connected to the conductor 7 through a filter choke 39, a filter capacitor 40 serving to keep the voltage constant at the point where the lines 36 and 37 join. This capacitor 40 is connected between this junction and the casing 4 by a line 41.

The primary 42 of an output transformer is connected in the line 36, and the secondary 43 of this transformer is connected through a line 44 and a coupling capacitor 45 with the conductor 7, the secondary 43 connecting to ground through a line 46.

It should now be apparent that the described apparatus forms a remote reading ultramicrometer capacitance gauge. The strain-responsive variable capacitance tuning capacitor formed by the cylinders 15 and 18, and the electronic oscillator which is tuned by this capacitor, are located together and organized into a single unit by the casing 4. This unit may be lowered into the well by the cable 5 and it will deliver a signal back to ground level where the capacitance of the strain-responsive unit may be measured by measuring the frequency of the signal through the use of the meter 14. The conductor carrying the signal also carries the necessary plate and filament circuit power to the unit, as required to power the oscillator's tube. It might be possible to include batteries within the casing 4 but this would increase the necessary size of the latter. In oil well work practical considerations require that the diameter of the casing 4 be kept to a small dimension.

It has been found that the cylindrical shape of the electrostatic plate 15 provides for a uniform strain of this plate by the external fluid pressure. This tends to make the necessary calibration of the device easier and assures its more accurate operation when in service. It is to be noted that the wall thickness of the part 15 is reduced throughout its area which cooperates with the other plate 18, the balance of the element being of thicker wall thickness so as to be substantially unaffected by the fluid pressure.

Although the device has been described in connection with oil well use, the principles involved may prove valuable whenever it is desired to read an ultramicrometer capacitance gauge at a remote location.

The cable 5 is necessarily long and has considerable capacitance and it is, therefore, necessary to operate the the oscillator within a frequency range that is relatively low. In practical work the oscillator may be tuned to a frequency in the neighborhood of 20,000 C. P. S. when the pressure measuring capacitor is unstrained by pressure. It follows that the output transformer and the inductor used in the resonant circuit with the measuring capacitor must have ferromagnetic cores. Units using Permalloy dust have been used in the actual working of the invention.

Such units using a core of magnetic material cannot be relied upon to maintain their properties when heated to the elevated temperatures encountered in oil well use, for example. If the inductance of the inductor 25 changes due to temperature it obviously becomes impossible to determine whether the change in frequency of the signal, observed at the top of the well, is due to the pressure on the measuring capacitor or due to a change in the inductance in the oscillating circuit.

On the other hand, capacitors may be made so that they are substantially stable when subjected to widely varying temperature conditions. The space between the plates may use air as a dielectric. In the device illustrated the space has been evacuated when the apparatus was used under practical oil well conditions.

Figure 2:
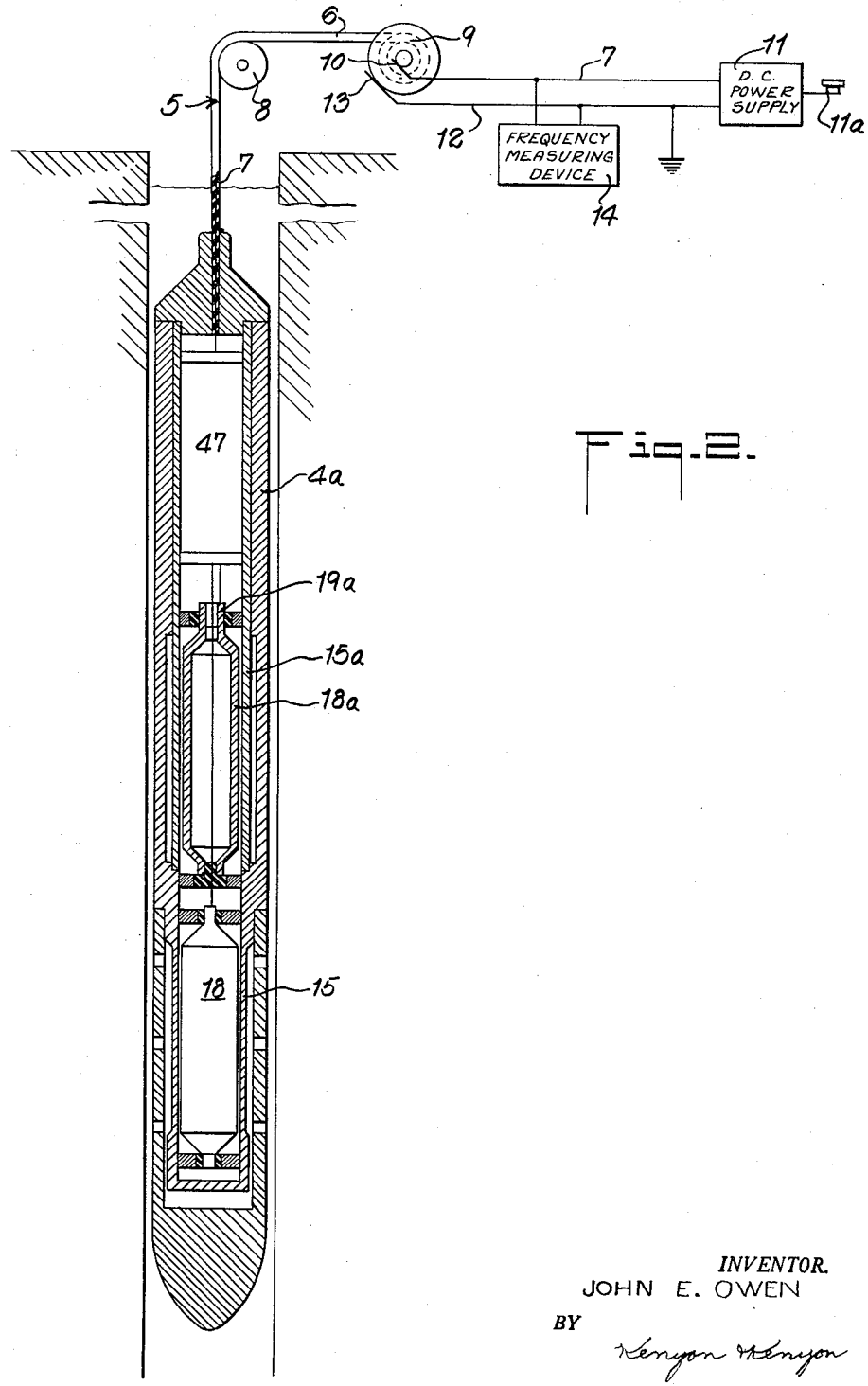
Fig. 2 shows a preferred form of the gauge in use.

With the foregoing in mind the preferred form of the gauge, shown in Fig. 2, is provided with a comparison capacitor formed by the outer cylinder 15a and the inner cylinder 18a which substantially duplicate the construction of the measuring capacitor, previously described. The corresponding parts are numeraled the same as in the case of Fig. 1 and are identified as separate parts by the use of the letter a.

The capacitances of the two capacitors may be made nearly equal, considering the measuring capacitor to be at rest or unstrained, and the spaces between the plates of the two capacitors are both evacuated. However, the comparison capacitor is enclosed by the casing 4a, in Fig. 2, so that it is completely shielded from the pressure of the fluid in which the casing is immersed. This casing also encloses, in a fluid-tight and protective manner, a chamber 47 providing space for the necessary electronic equipment and the various circuit elements.

Now according to the invention the equipment mounted in the casing 4a includes a remotely controlled means for switching at least one of the two capacitors in and out of the oscillating circuit. This means is provided with a controller which may be operated at the top of the well. The comparison capacitor, of fixed capacitance, must, of course, be included in the oscillating circuit at one time or another. For example, the measuring capacitor of variable capacitance may be normally included in the oscillating circuit and switched out of this circuit while the comparison capacitor is switched into the circuit to act as a substitute. The measuring capacitor may be left connected in the oscillator circuit and the comparison capacitor may be switched in and out of this circuit. It is also possible to connect the comparison capacitor so that it is normally in the oscillator circuit, the measuring capacitor then being switched in and out of this circuit.

In all such instances it is possible to obtain two signals, and it becomes possible to determine the strain of the measuring capacitor since it is a function of the ratio of the frequencies of the two signals which may be measured at the top of the well. This makes it unimportant whether or not the frequencies of the signals has been affected by changes in the inductance values of the inductors located at the point where the measurements are obtained and which may be subjected to widely varying temperature conditions.

As indicated above, two frequencies are measured on the surface, one before and one after the switching operation; from the values of these two frequencies the capacity of the variable pressure responsive condenser may be as follows:

Denoting by $x$ and $C$ the values of the measuring and comparison capacitors respectively, and by $f_1$ and $f_2$ the frequencies before and after switching (for the three methods of switching respectively) are:

$$f_1 = 1/2\pi\sqrt{Lx} \quad f_2 = 1/2\pi\sqrt{CL}$$

from which $$x = Cf_2^2/f_1^2$$

$$f_1 = 1/2\pi\sqrt{Lx} \quad f_2 = 1/2\pi\sqrt{L(x+C)}$$

from which $$x = C\frac{f_2^2}{f_1^2 - f_2^2}$$

$$f_1 = 1/2\pi\sqrt{L(C+x)} \quad f_2 = 1/2\pi\sqrt{LC}$$

from which $$x = C\frac{f_2^2 - f_1^2}{f_1^2}$$

Figure 3:
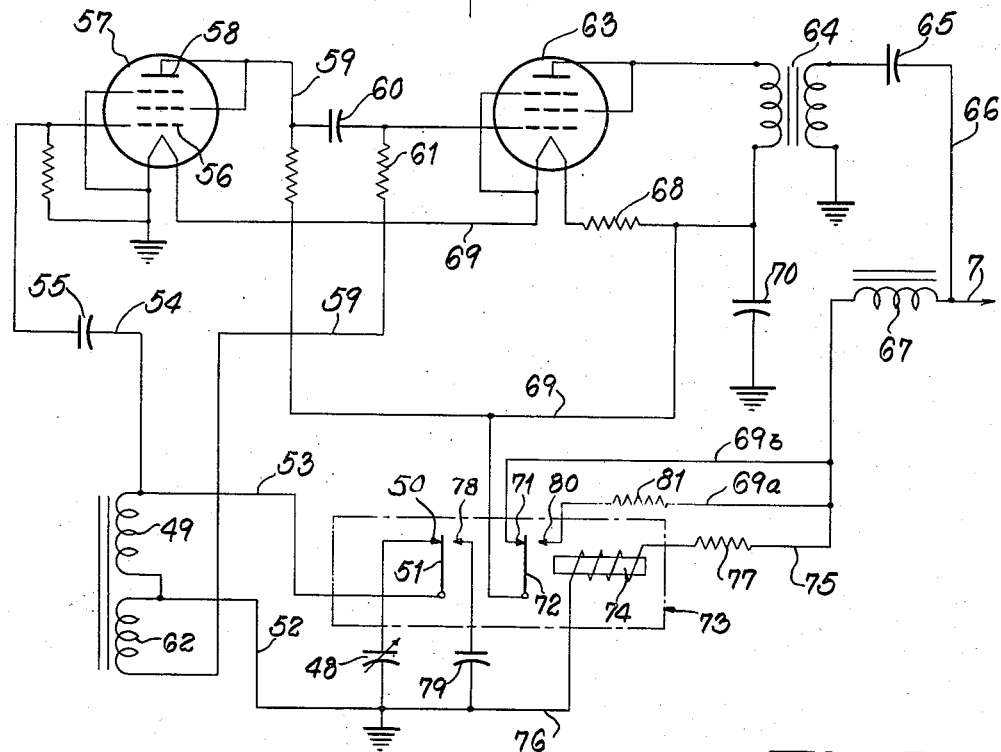
Fig. 3 is a diagram showing the operating circuit of this preferred form.
Figures 4, 5:
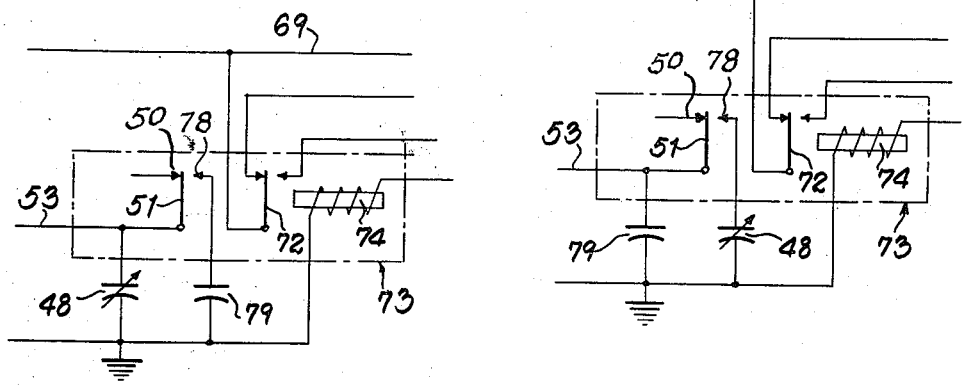
Fig. 4 is a diagram showing a modification of Fig. 3.
Fig. 5 is a diagram showing a second modification of Fig. 3.

Suitable operating circuits are shown by Figs. 3 through 5. In each instance the various components and circuit elements may be housed in the space 47 previously described.

In Fig. 3 the measuring capacitor 48 is normally connected to the inductor 49 through the contact 50 and contactor 51 of a relay, by way of a grounded line 52 and the line 53 which goes to the contactor 51. This inductor may be the winding of a choke, as described before, the line 54 and capacitor 55 connect this oscillating circuit to the grid 56 of a tube 57, the plate 58 of this tube being connected through a line 59 and a coupling capacitor 60 and a resistor 61 to the secondary winding 62 which is associated with the inductor 49. This provides the electronic oscillator as described before. The electron tube 63 provides a single stage of amplification and need not be described further. The output of the oscillator is by way of an output transformer 64 and a coupling capacitor 65 which connects through a line 66 with the conductor 7 of the cable 5. Also, this conductor 7 connects through a filter choke 67 with the plate and filament circuits of the tubes. The resistor 68 in the filament circuit, formed by the line 69 serving to drop the voltage as before. The plate circuit may also have a filter capacitor 70. It is to be noted that the line 69 connects with the conductor 7 through a contact 71 and a contactor 72 which are provided by the previously described relay. Generally speaking, the arrangement as described so far is the same as that described in the case of Fig. 1, the amplification provided by the tube 63 being, of course, a conventional way for boosting the output.

The contactors 51 and 72 of the relay, generally indicated at 73 are biased so as to normally close at the contacts 50 and 71. The solenoid 74 of this relay, which operates the contactors 51 and 72 simultaneously is connected to the conductor 7 by a line 75 and to ground by a line 76, the ground in this instance being the casing 4a which is, of course, connected to the armor of the cable 5. A resistor 77 is interposed in the line 75 so that when the D. C. power supply 11, at the top of the well, supplies a voltage suitable for the plate circuits of the tube 57 and 63, the relay does not operate. The value of the resistor 77 is such that with a higher voltage the relay does operate.

Operation of the relay causes the contactor 51 to close with a contact 78 which connects the comparison capacitor 79 in the oscillator circuit while simultaneously switching out the measuring capacitor 48. The supply source 11, in Fig. 2, is shown as being supplied with a lever 11a which controls the supply source to increase the voltage as required to operate the relay 73.

The increase in voltage required to operate the relay 73 is preferably not applied to the plate and filament circuits of the tubes. It is for this reason that the line 69 goes through the contacts 71 and contactor 72, operation of the relay shifting the contactor 72 to a contact 80 which connects with the conductor 7 through a branch line 69a in which a resistor 81 is interposed. When the relay switches it connects the line 69 with the conductor 7 through the resistor 81, and when the relay switches back, to reinsert the measuring capacitor 48, the line 69 connects with the conductor 7 through a branch line 69b. The resistor 81 has a value which drops the increased voltage required to operate the relay 73, so that the voltage applied to the plate circuit of each tube, and to the filament circuit, through the resistor 68, has substantially the same value it had during normal operation.

In Fig. 4, the relay 73 is arranged so that the measuring capacitor 48 is always in the oscillator circuit while the comparison capacitor 79 is switched in or out. This rearrangement consists simply in connecting the capacitor 48 directly between the line 53 and ground.

In Fig. 5, the relay 73 is arranged with the comparison capacitor 79 permanently connected in the oscillator circuit by being connected between the line 53 and ground. The measuring capacitor 48 is then switched in or out by being connected between the contact 78 and ground.

In operating this preferred form of the invention the procedure is substantially as described in connection with the form shown by Fig. 1. However, the pressure measurement is obtained from the ratio of the frequencies of the two signals obtained before and after increasing the voltage of the D. C. power supply 11. Since the two capacitors are at the same temperature, and since they are of similar construction, the results will be independent of temperature. It is to be understood that although temperature effects will change the frequencies of the signals it will have the same effect on both signals whereby the frequency differences will depend on the amount of strain in the wall 15 of the measuring capacitor.

The cable supporting the device should have the two conductors, provided by the armor and single conductor, to carry the plate and filament current to the device. The signal might be carried through the earth, if desired, using the insulated conductor for the other path. Although electron tubes have been disclosed, they may be substituted by other electronic devices, such as transistors.

I claim:

1. A remote reading fluid pressure gauge including a casing adapted to be lowered in the fluid, an electronic oscillator located in said casing and including an inductor and a fluid-pressure-responsive variable capacitance tuning capacitor, said casing having means for sealing said oscillator fluid-tightly from the fluid excepting for said capacitor and for mechanically protecting the latter while transmitting thereto the pressure of said fluid, a cable connected to said casing for use in lowering the latter and including at least one insulated conductor, means located in said casing for coupling the output of said oscillator to said conductor and to ground, means for powering said oscillator, said means for powering said oscillator comprising an electron tube having plate and filament circuits requiring power at relatively high and low potentials respectively, means located at said remote cable end for applying power to said conductors at said high potential, said conductors being connected to said circuits, and means in said filament circuit for dropping the potential therein to said low potential, said oscillator including a comparison capacitor of fixed capacitance, a relay having an actuating solenoid and contacts for switching at least one of said capacitors in and out of the oscillator, said solenoid being connected to said conductors for actuation of said contacts by an increase in the potential of the power applied to the conductors at said remote cable end, and a resistor, said relay having additional contacts for switching the last-named resistor into said plate and filament circuits so as to reduce the potential therein when the potential of the power applied to said conductors is increased to actuate said contacts.

2. A fluid pressure gauge adapted to be lowered by cable into a fluid to provide frequency readings at a remote point indicative of fluid pressure, said gauge comprising a cylindrical casing, means dividing said casing into first and second compartments, said first compartment being fluid-tight and being adapted to house an electronic oscillator having a resonant circuit, said casing having openings therein admitting fluid into said second compartment, a pressure sensitive capacitor disposed within said second compartment and including inner and outer tubular electrodes coaxially disposed within said casing, said outer electrode being concentrically spaced from said casing to define an annular chamber in communication with said fluid through said casing openings whereby said outer electrode is uniformly subjected to strain as a function of the pressure of said fluid to vary the capacitance of said capacitor accordingly, said capacitor in said second compartment being adapted for connection to said resonant circuit, whereby the frequency of said oscillator is controlled as a function of fluid pressure.

3. A gauge, as set forth in claim 2, further including a second capacitor substantially identical in structure with the first capacitor and disposed within said fluid-tight compartment whereby said second capacitor has a fixed value which is independent of fluid pressure, and relay means in said fluid-tight compartment selectively to substitute said second capacitor for said first capacitor in said resonant circuit to produce a comparison frequency.

4. A gauge, as set forth in claim 3, wherein said electronic oscillator is powered by a voltage of predetermined magnitude applied thereto through said cable and said relay is actuated by a second voltage of higher magnitude applied through the same cable, and further including means responsive to the actuation of said relay by the higher voltage simultaneously to reduce the voltage applied to said electronic oscillator to said predetermined magnitude.

References Cited in the file of this patent

UNITED STATES PATENTS

| | | |
|---|---|---|
| 1,929,241 | Franklin | Oct. 3, 1933 |
| 2,381,904 | Hare | Aug. 14, 1945 |
| 2,416,702 | Krasnow | Mar. 4, 1947 |
| 2,418,836 | Hawes | Apr. 15, 1947 |
| 2,425,868 | Dillon | Aug. 19, 1947 |
| 2,662,408 | Ellison | Dec. 15, 1953 |
| 2,667,786 | Spaulding | Feb. 2, 1954 |
| 2,669,877 | Dunlop | Feb. 23, 1954 |
| 2,674,049 | James | Apr. 6, 1954 |